(12) United States Patent
Lee

(10) Patent No.: US 8,862,936 B2
(45) Date of Patent: Oct. 14, 2014

(54) APPARATUS AND METHOD OF MANAGING DATABASES OF ACTIVE NODE AND STANDBY NODE OF MAIN MEMORY DATABASE MANAGEMENT SYSTEM

(75) Inventor: Seung-Won Lee, Seoul (KR)

(73) Assignee: Altibase Corporation, Seoul (KR)

(*) Notice: Subject to any disclaimer, the term of this patent is extended or adjusted under 35 U.S.C. 154(b) by 221 days.

(21) Appl. No.: 13/456,827

(22) Filed: Apr. 26, 2012

(65) Prior Publication Data

US 2013/0151895 A1 Jun. 13, 2013

(30) Foreign Application Priority Data

Dec. 9, 2011 (KR) .................. 10-2011-0132154

(51) Int. Cl.
*G06F 11/00* (2006.01)

(52) U.S. Cl.
USPC ......................................................... 714/16

(58) Field of Classification Search
CPC .................... G06F 11/1471; G06F 11/1492
See application file for complete search history.

(56) References Cited

U.S. PATENT DOCUMENTS

| 7,587,435 | B2 * | 9/2009 | Shepherd .............................. 1/1 |
| 8,521,695 | B2 * | 8/2013 | Zwilling et al. .............. 707/649 |
| 2003/0061537 | A1 | 3/2003 | Cha et al. |
| 2008/0114816 | A1 * | 5/2008 | Shepherd ...................... 707/201 |
| 2011/0087633 | A1 * | 4/2011 | Kreuder et al. ............... 707/610 |
| 2012/0317076 | A1 * | 12/2012 | Zhu et al. ...................... 707/626 |
| 2013/0036089 | A1 * | 2/2013 | Lucas .......................... 707/615 |
| 2013/0036105 | A1 * | 2/2013 | Lucas .......................... 707/703 |
| 2013/0246358 | A1 * | 9/2013 | Akulavenkatavara et al. ............................ 707/634 |
| 2014/0025634 | A1 * | 1/2014 | Dennehy et al. .............. 707/623 |

OTHER PUBLICATIONS

Non-Final Rejection for Korean Patent Application No. KR 10-2011-0132154, Dec. 3, 2012, 14 pages.

* cited by examiner

*Primary Examiner* — Christopher McCarthy
(74) *Attorney, Agent, or Firm* — Fenwick & West LLP

(57) ABSTRACT

Databases of an active node and a standby node of a main memory database management system (MMDBMS) are managed so as to prevent loss of a transaction caused by failure of any one of the active node or the standby node. The MMDBMS is configured to prevent data mismatch between the active node and the standby node when failure of any one of the active node and the standby node occurs. In case of failure of one of the nodes, log information from the other node is obtained to recover the failed node.

18 Claims, 9 Drawing Sheets

| DATA STORED IN DB | COMMAND | LOG COLUMN 1 (131) TID (Transaction ID) | LOG COLUMN 2 (132) SN (Sequence Number) | LOG COLUMN 3 Operation Flag | LOG COLUMN 4 Tuple Identifier (Primary key) | LOG COLUMN 5 Before Image | LOG COLUMN 6 After Image |
|---|---|---|---|---|---|---|---|
| 1,2,3 | – | – | – | – | – | – | – |
| 1,2,3 | Delete 3 | 100 | 1 | D | 3 | 3 | – (NULL) |
| 1,2,3 | Delete 2 | 100 | 2 | D | 2 | 2 | – |
| 1,2,3 | Insert 5 | 100 | 3 | I | – | – | 5 |
| 1,5 | Commit | 100 | 4 | C | – | – | – |
| 1,5 | Insert 6 | 101 | 5 | I | – | – | 6 |
| 1,5,6 | Commit | 101 | 6 | C | – | – | – |
| 1,5,6 | ex> Update 6→9 | 102 | 7 | U | 6 | 6 | 9 |
| 1,5,9 | ex> Commit | 102 | 8 | C | – | – | – |

DATABASE LOG (130)

FIG. 1B

APPARATUS AND METHOD OF MANAGING DATABASES OF ACTIVE NODE AND STANDBY NODE OF MAIN MEMORY DATABASE MANAGEMENT SYSTEM

CROSS-REFERENCE TO RELATED PATENT APPLICATION

This application claims priority under 35 U.S.C. 119(a) from Korean Patent Application No. 10-2011-0132154, filed on Dec. 9, 2011, in the Korean Intellectual Property Office, the disclosure of which is incorporated herein in its entirety by reference.

BACKGROUND OF THE INVENTION

1. Field of the Invention

The present invention relates to managing databases of an active node and a standby node of a main memory database management system, and more particularly, to managing a database so as to prevent data mismatch between an active node and a standby node of a main memory database management system when a transaction is lost due to failure of any one of the active node and the standby node.

2. Description of the Related Art

Since it is essential to process data at high speed in an Internet service system that enables subscribers to have network access or a communication system, a database of the Internet service system or the communication system in which data is stored or managed is required to process data at high speed. Main memory database management systems (MMDBMS) are used for processing data at high speed.

A conventional disk-based database management system (DBMS) is configured such that a table and an index of a database exist in a disk and a data page or an index page to be accessed is read and processed by a memory buffer from the disk. In contrast, an MMDBMS is configured such that a database existing in a disk during initial operation is resident in memory and all data is accessed from the memory, thereby making it possible to process data at high speed.

In general, logging of record changes in a database is executed by a DBMS to ensure stability of the database. Logging is a basic function of a DBMS to record changes such as insert/delete/update in a stable storage device such as a disk in real time. In case of a failure, the recorded actions can be used by the DBMS to return to a final database state.

It is important to ensure not only high speed operation and stability of a database but also durability of the database. A transaction must be atomic, consistent, isolated, and durable (ACID). The term "durability" refers to an ability to ensure that "once a transaction is successfully committed, a result of the transaction is applied to a database even when system failure occurs".

In order to provide durability, a conventional disk-based DBMS is configured such that when a transaction is committed, all logs of the transaction are permanently flushed to a disk. However, the flushing of logs to the disk that is regarded as a slowest medium degrades the overall performance of the conventional DBMS.

Accordingly, in order to provide better performance and somewhat reduced durability, an MMDBMS is configured such that when a transaction is committed, the transaction is completely committed even when logs of the transaction are flushed to only a memory, and then all logs existing in the memory are permanently flushed to a disk in a process (or thread) different from a process of committing the transaction.

However, in this case, even when the transaction performed by a user is committed, changes to the transaction may be lost in a state where the logs of the transaction are not permanently flushed to the disk.

For example, if unexpected failure occurs due to power failure or operating system (OS) panic in the MMDBMS, since the logs of the transaction are flushed to the memory to be recorded but are not flushed to the disk yet, the transaction may be lost even when the transaction is completely committed.

SUMMARY OF THE INVENTION

Apparatus, method, and computer program product allow management of a database so as to prevent data mismatch between an active node and a standby node of a main memory database management system (MMDBMS) when a transaction is lost due to failure of any one of the active node and the standby node of the MMDBMS. Technical problems to be solved by various embodiments are not limited thereto, and other technical problems would have been obvious to one of ordinary skill in the art from the following description.

According to an embodiment, there is provided an apparatus for managing a database of an active node of an MMDBMS that is replicated from the active node to a standby node. The apparatus includes a memory logging unit that records a database log to which a sequence number is sequentially allocated in a log buffer of a memory of the active node. The apparatus includes a replicating unit that replicates the database log to the standby node. A disk flushing unit periodically flushes the database log to a disk of the active node. A recovering unit, when failure of the active node occurs, transmits a sequence number of a last recovered log that is finally recovered to the standby node, receives at least one replication log belonging to a transaction including a lost log recorded after the last recovered log from the standby node, and recovers the database of the active node based on the at least one replication log.

According to another embodiment, there is provided a method of managing a database of an active node of an MMDBMS that is replicated from the active node to a standby node. The method includes recording a database log to which a sequence number is sequentially allocated in a log buffer of a memory of the active node. The database log is replicated to the standby node. The database log is periodically stored in a disk of the active node. A sequence number of a database log corresponding to a replication log stored in a disk of the standby node is allowed to be reported from the standby node.

According to embodiments of the method, when failure of the active node occurs, a sequence number of a last recovered log that is finally recovered is transmitted to the standby node. At least one replication log belonging to a transaction including a lost log recorded after the last recovered log from the standby node is received. The database of the active node is recovered based on at least one replication log.

According to another embodiment, a non-transitory computer readable storage medium stores a computer program product including computer instructions configured to manage a database of an active node of the MMDBMS. The computer program product includes a memory logging unit configured to record a database log to which a sequence number is sequentially allocated in a log buffer of a memory of the active node. The computer program product includes a replicating unit configured to replicate the database log to the standby node. The computer program product includes a disk flushing unit configured to periodically flush the database log to a disk of the active node. The computer program product includes a recovering unit configured to transmit a sequence number of a last recovered log that is finally recovered to the standby node responsive to a failure of the active node, receive at least one replication log belonging to a transaction including a lost log recorded after the last recovered log from the standby node, and recover the database of the active node based on the at least one replication log.

According to another embodiment, there is provided an apparatus for managing a database of a standby node of an MMDBMS that is replicated from an active node to the standby node. The apparatus includes a memory logging unit that allows a database log to which a sequence number is sequentially allocated to be replicated thereto from the active node, and records changes to the database which occur during a transaction performed based on the database log as a replication log to a log buffer of a memory of the standby node. A disk flushing unit periodically flushes the replication log to a disk of the standby node; a log flush reporting unit that periodically reports a sequence number of a database log corresponding to the flushed replication log to the active node. When failure of the standby node occurs, a recovering unit receives a recovery-replication log obtained by replicating a database log after a database log having a sequence number that is finally reported from the active node, and recovers the database of the standby node based on the replication log for recovery.

According to still another embodiment, there is provided a method for managing a database of a standby node of an MMDBMS that is replicated from an active node to the standby node. A database log to which a sequence number is sequentially allocated is replicated from the active node. The standby node records changes to the database which occur during a transaction performed based on the database log as a replication log to a log buffer of a memory of the standby node. The standby node stores the replication log and a sequence number of a database log corresponding to the replication log in a transaction table in units of transaction. The replication log is periodically stored in a disk of the standby node. A sequence number of a database log corresponding to the flushed replication log is periodically reported to the disk of the active node.

According to another embodiment, a non-transitory computer readable storage medium stores a computer program product including computer instructions to manage a database of a standby node of the MMDBMS. The computer program product includes a memory logging unit configured to allow a database log to which a sequence number is sequentially allocated to be replicated thereto from the active node. The memory logging unit is further configured to record changes to the database which occur during a transaction performed based on the database log as a replication log to a log buffer of a memory of the standby node. The computer program product includes a disk flushing unit configured to periodically flush the replication log to a disk of the standby node. The computer program product includes a log flush reporting unit configured to periodically report a sequence number of a database log corresponding to the flushed replication log to the active node. The computer program product includes a recovering unit configured to receive a recovery-replication log from the active node responsive to failure of the standby node, and recover the database of the standby node based on the replication log for recovery.

BRIEF DESCRIPTION OF THE DRAWINGS

The above and other features and advantages of the present invention will become more apparent by describing in detail exemplary embodiments thereof with reference to the attached drawings in which:

FIG. 1B is a table illustrating a database log recorded in a log buffer of a memory of the MMDBMS of FIG. 1A;

DETAILED DESCRIPTION OF THE INVENTION

Figure 1A:
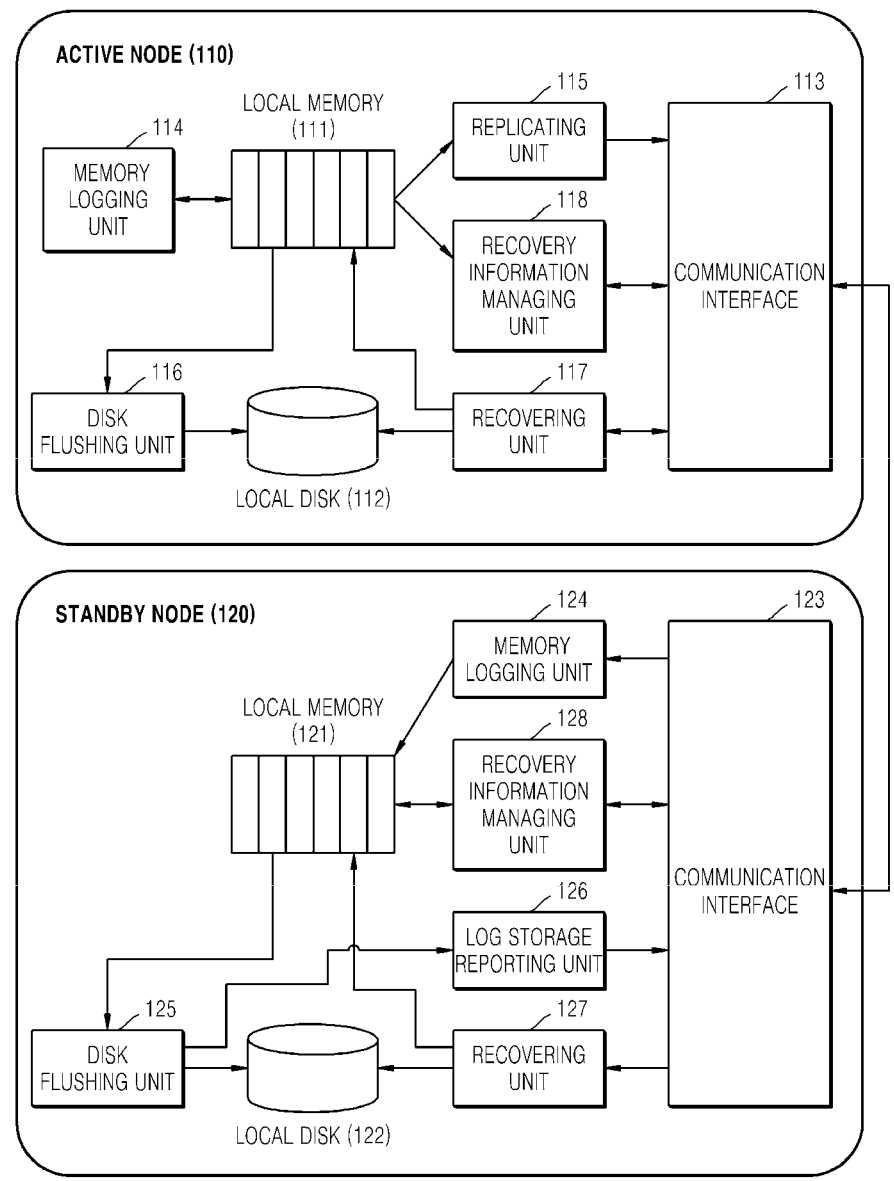
FIG. 1A is a block diagram illustrating a replication structure of an MMDBMS according to an embodiment of the present invention.

The preceding merely illustrates the principles of the invention. It will thus be appreciated that one of ordinary skill in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Functions of various devices that are illustrated in drawings including a function block denoted as a processor or as a similar concept with the processor, can be provided not only with specific hardware but also general hardware in which related software may be executed. When these functions are provided by the processor, the functions may be provided by a singular specific processor, a singular sharable processor, or plural processors in which sharing between the plural processors is possible. Also, usage of terms such as a processor, a control, or the like should not be construed as being limited to hardware capable of executing software but should be construed as indirectly including digital signal processor (DSP) hardware, read-only memory (ROM), random-access memory (RAM), and non-volatile memory used for storing software. Other well-known conventional hardware devices may be included.

Hereinafter, exemplary embodiments of the invention are explained with reference to the attached drawings. In the following description, parts will not be explained when it is deemed that they make unnecessarily obscure the subject matter of the invention.

Unless noted otherwise, the word "comprise" or variations such as "comprises" or "comprising" is understood to mean "includes, but is not limited to" so that other elements that are not explicitly mentioned may also be included.

The present invention will now be described more fully with reference to the accompanying drawings, in which exemplary embodiments of the invention are shown.

An MMDBMS applied to a high-performance system has to ensure stability of a database, that is, provide service without being stopped even when failure occurs. To this end, the MMDBMS is replicated from an active node to a standby node, so as to provide the database replication. If there is a loss of transaction in an MMDBMS due to a failure, the loss of the transaction leads to data mismatch between two nodes, that is, an active node and a standby node, of the MMDBMS. Data mismatch between two nodes due to the loss of a transaction caused by failure in an MMDBMS is prevented according to embodiments of the present invention.

FIG. 1A is a block diagram illustrating an MMDBMS according to an embodiment of the present invention. FIG. 1B is a table illustrating a database log 130 recorded in a log buffer of a local memory 111 of the MMDBMS of FIG. 1A.

Referring to FIG. 1A, the MMDBMS is replicated from an active node 110 to a standby node 120, and thus ensures stability of a database. The active node 110 includes a memory logging unit 114, a replicating unit 115, a disk flushing unit 116, a recovering unit 117, and a recovery information managing unit 118. The memory logging unit 114 records the database log 130 in the log buffer of the local memory 111. The term "database log" refers to changes to a database which occur during transaction actions such as insert/delete/update or transaction control, and the MMDBMS maintains the database in a consistent state by performing a redo or undo operation based on the database log.

Referring to FIG. 1B, the database log 130 includes a transaction identifier (TID) 131 to which a log belongs, and a sequence number (SN) 132 that is sequentially allocated to the log. Accordingly, when a transaction to which the database log 130 belongs is committed or recovered in the MMDBMS, the transaction to which the database log 130 belongs and the execution sequence of the database log 130 may be determined.

The replicating unit 115 replicates the database log 130 recorded in the memory logging unit 114 to the standby node 120 via a communication interface 113. The replicating unit 115 replicates the database log 130 including an SN of the database log 130 and an ID of a transaction to which the database log 130 belongs and transmits the replicated log to the standby node 120.

The disk flushing unit 116 periodically flushes the database log 130 recorded in the memory logging unit to a local disk 112. A process of flushing the database logs 130 which is performed by the disk flushing unit 116 may be independently performed from a process of committing the transaction to which the database log 130 belongs and a process of replicating the database log 130. For example, a user of the MMDBMS may set an environment variable of the MMDBMS by inputting an absolute value of a database log flush cycle.

The recovering unit 117 transmits an SN of a last recovered log when failure of the active node 110 occurs to the standby node 120 via the communication interface 113. The recovering unit 117 receives at least one replication log belonging to a transaction including a lost log recorded after the last recovered log from the standby node 120, and recovers a database of the active node 110 based on the at least one replication log.

The recovery information managing unit 118 transmits, when failure of the standby node 120 occurs, database logs belonging to a transaction which are determined to be lost in the standby node 120 to the standby node 120, and helps a database of the standby node 120 to be recovered. The recovery information managing unit 118 of the active node 110 allows an SN of a database log corresponding to a replication log flushed to a local disk 122 of the standby node 120 to be periodically reported thereto from the standby node 120, stores the SN of the database log in a local memory 121. In case of failure of the standby node 120, the recovery information managing unit 118 reads database logs recorded after a database log having an SN that is finally received, replicates the database logs to the standby log 120, and recovers the database of the standby node 120 having a high risk of transaction loss due to the failure.

The standby node 120 includes a memory logging unit 124, a disk flushing unit 125, a log storage reporting unit 126, a recovering unit 127, and a recovery information managing unit 128. The memory logging unit 124, the disk flushing unit 125, the recovering unit 127, and the recovery information managing unit 128 of the standby node 120 may respectively correspond to the memory logging unit 114, the disk flushing unit 116, the recovering unit 117, and the recovery information managing unit 118 of the active node 110.

The memory logging unit 124 receives replicated database logs from the active node 110 via a communication interface 123, performs a local transaction on the database of the standby node 120, and records changes to the database of the standby node 120 during the local transaction as a replication log in a log buffer of the local memory 121.

That is, in FIG. 1, the term "replication log" does not refer to a log obtained by replicating a database log received from the active node 110, but refers to a log newly logged to the log buffer of the local memory 121 of the standby node 120 as the database changes due to a transaction performed based on the log obtained by replicating the database log received from the active node 110.

An SN of a replication log recorded in the log buffer of the standby node 120 may be sequentially allocated independently from an SN of a database log recorded in the log buffer of the active node 110.

Accordingly, in order to prevent data mismatch between the active node 110 and the standby node 120 and maintain data consistency, the memory logging unit 124 may map an SN of a replication log to an SN of a database log corresponding to the replication log to obtain a result and store the result in a transaction table of the local memory 121 in units of transaction. For example, if an SN of a database and an SN of a replication log are different from each other, the SN of the database log and the SN of the replication log may be mapped to each other and then stored.

The disk flushing unit 125 periodically flushes a replication log recorded in the log buffer of the local memory 121 to the local disk 122.

The log storage reporting unit 126 periodically reports an SN of a database log corresponding to a replication log flushed in the disk flushing unit 125 to the active node 110.

The recovering unit 127 receives, when failure of the standby node 120 occurs, a recovery-replication log obtained by replicating a database log after a database log having an SN that is finally reported from the active node 110 via the communication interface 123. The recovering unit 127 recovers the database of the standby node 120 based on the replication log for recovery.

The recovery information managing unit 128 transmits, when failure of the active node 110 occurs, database logs belonging to a transaction which are determined to be lost in the active node 110 to the active node 110, and helps a database of the active node 110 to be recovered. The recovery information managing unit 128 of the standby node 120 may include a log searching unit (not shown) and a replication log transmitting unit (not shown).

The log searching unit receives, when failure of the active node 110 occurs, an SN of a last recovered log that is finally recovered via the communication interface 123 from the active node 110 and searches for all replication logs belonging to a transaction including a lost log after the last recovered log based on the transaction table.

The replication log transmitting unit may transmit the replication logs searched by the log searching unit via the communication interface 123 to the active node 110 and recover the database of the active node 110 having transaction loss due to the failure.

Figure 2A:
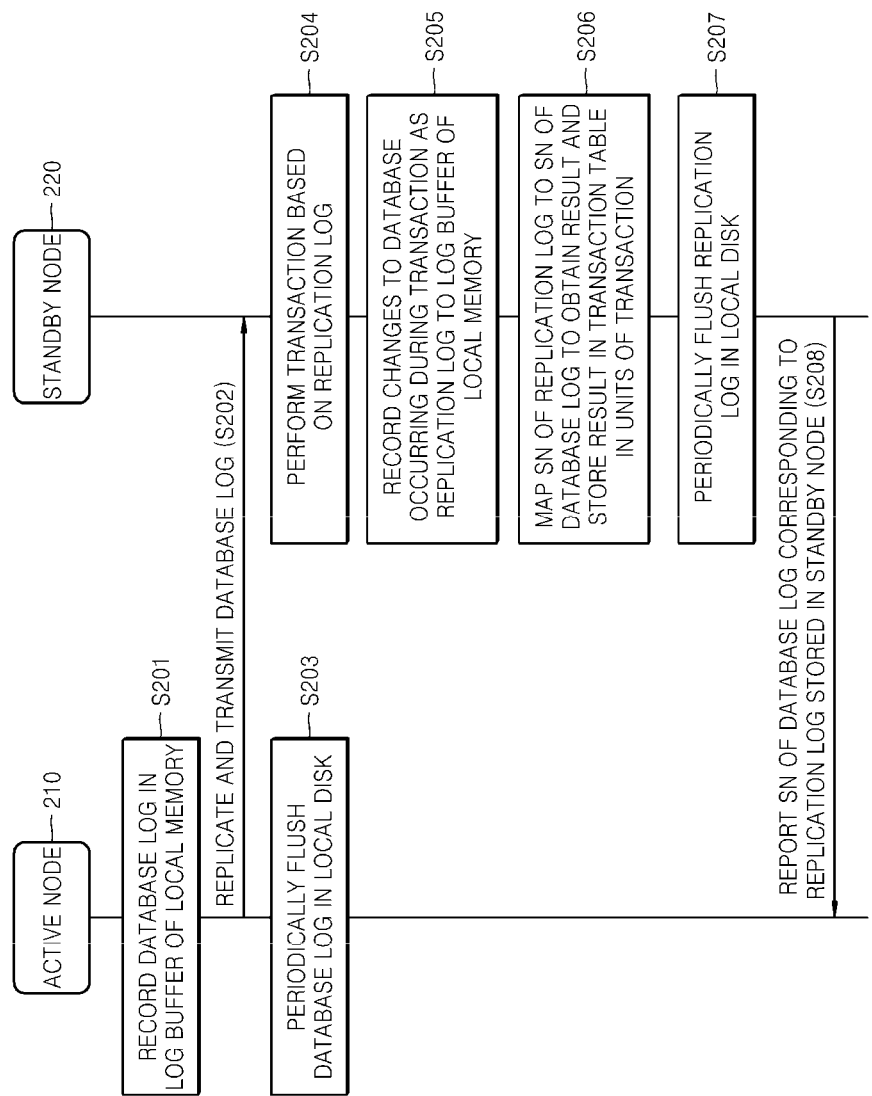
FIGS. 2A, 2B, and 2C are flowcharts illustrating a method of managing a database in order to ensure durability of a transaction in the MMDBMS of FIG. 1A, according to an embodiment of the present invention.
Figure 2B:
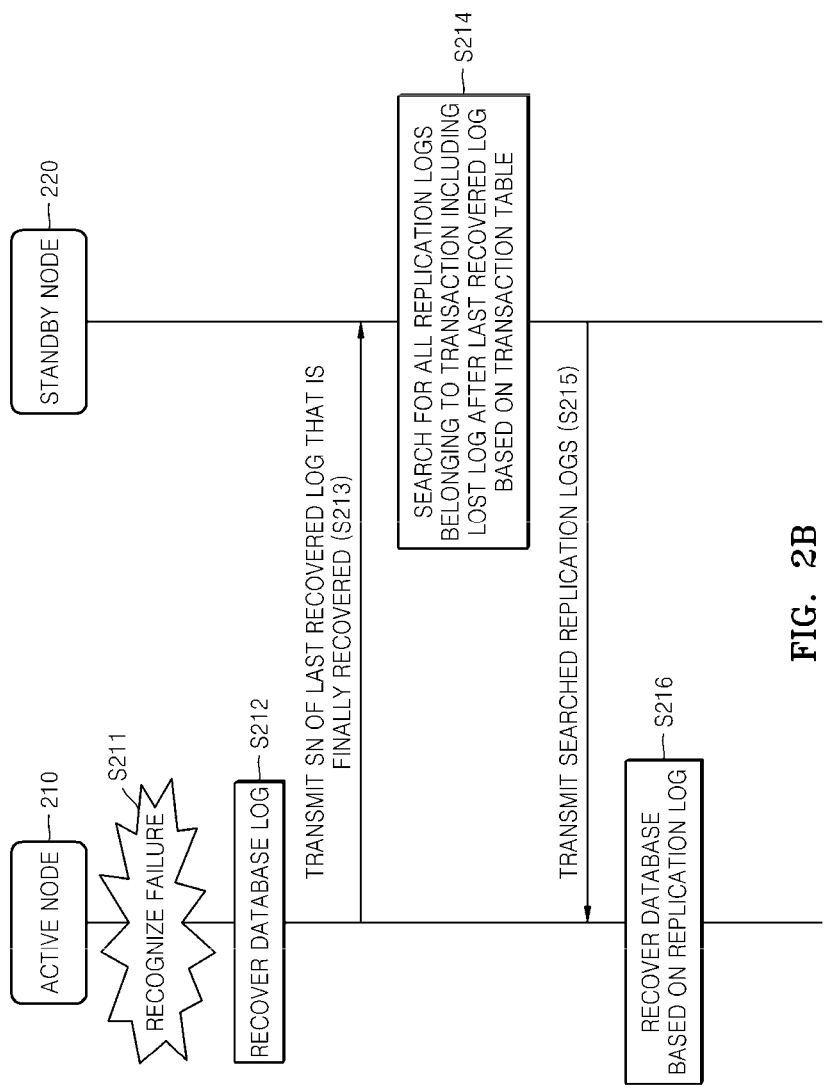
Figure 2C:
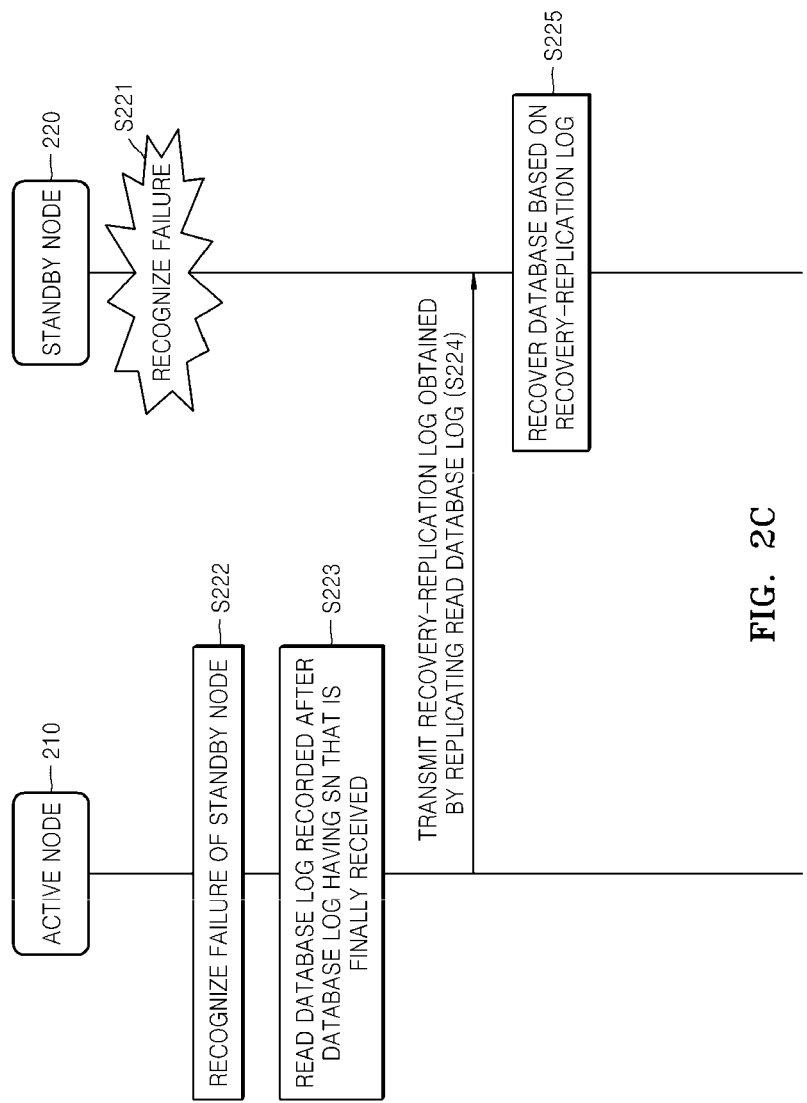

FIGS. 2A through 2C are flowcharts illustrating a method of managing a database in order to ensure durability of a transaction in an active node 210 and a standby node 220 of an MMDBMS, according to an embodiment of the present invention. The active node 210 and the standby node 220 respectively correspond to the active node 110 and the standby node 120 of the MMDBMS of FIG. 1A. Accordingly, a repeated explanation will not be given.

FIG. 2A illustrates a method of managing data when no failure of any one of the active node 210 and the standby node 220 occurs. Referring to FIG. 2A, in operation S201, the active node 210 records a database log indicating changes to a database in a log buffer of a local memory. In operation S202, the active node 210 replicates the database log recorded in operation S201 to obtain a replication log and transmits the replication log.

In operation S203, the active node 210 periodically flushes the database log recorded in operation S201 to a local disk independently from operation 202. Since operation S203 is performed independently from operation S202, operations S203 and S202 may be performed simultaneously or in reversed order without departing from the scope of the present invention. However, as the number of times S203 is performed increases, the performance of the MMDBMS may be degraded. Accordingly, it is preferable that the number of times operation S203 is performed on a plurality of database logs is as small as possible.

In operation S204, the standby node 220 performs a transaction based on the replication log transmitted in operation S202. In operation S205, the standby node 220 records changes to a local database which occur during the transaction as a replication log in a log buffer of a local memory. In operation S206, the standby node 220 maps an SN of the replication log to an SN of the database log to obtain a result and stores the result in a transaction table of a local memory in units of transaction. In this case, if the SN of the replication log is different from the SN of the database log, the standby node 220 may map the SN of the replication log to the SN of the database log in the transaction table to obtain a result and store the result.

In operation S207, the standby node 220 periodically flushes the replication log recorded in operation S206 in a local disk independently from operation S206. Since operation S207 is performed independently from operation S206, operations S206 and S207 may be performed simultaneously or in reversed order without departing from the scope of the present invention. However, as the number of times operation S207 is performed increases, the performance of the MMDBMS may be degraded. Accordingly, it is preferable that the number of times operation S207 is performed on a plurality of replication logs is as small as possible.

When operation 207 is completed, in order to report the completion, the method proceeds to operation S208. In operation S208, the standby node 220 reports an SN of a database log corresponding to the flushed replication log to the active node 210. The standby node 220 may report the SN of the database log by generating and transmitting a separate report message or by adding the SN of the database log to an ACK message of operation S202.

FIG. 2B illustrates a method of recovering a database of the active node 210 when failure of the active node 210 occurs.

In operation S211, failure of the active node 210 is recognized. In operation S212, the active node 210 recovers a database log that is not lost by being flushed to the local disk or being stored in a non-volatile memory region. After operation S212 is completely performed based on only information stored in the local memory and a storage unit, the method proceeds to operation S213. In operation S213, the active node 210 transmits an SN of a last recovered log that is finally recovered to the standby node 220.

In operation 214, the standby node 220 searches for a transaction including a lost log after the last recovered log having an SN transmitted in operation S213 based on the transaction table of the local memory and searches for all replication logs belonging to the searched transaction. In operation S215, the standby node 220 transmits the replication logs searched in operation S214 to the active node 210. In operation S216, the active node 210 recovers a transaction lost in the database based the replication logs transmitted in operation S215.

FIG. 2C illustrates a method of recovering a database of the standby node when failure of the standby node 220 occurs. In operation S222, the active node 210 recognizes failure of the standby node 220. In operation S223, the active node 210 reads the database log recorded in the log buffer of the local memory in operation S201 after a database log having an SN that is finally received from among SNs reported in operation S208 by the standby node 220. In operation S224, the active node 210 transmits a recovery-replication log obtained by replicating the database log read in operation S223. In operation S225, the standby node 220 recovers a transaction or a replication log that is lost in the database by not being flushed to the local disk based on the recovery-replication log transmitted in operation S224.

FIGS. 3A through 3D are diagrams for explaining a process of removing data mismatch due to the loss of a transaction in an MMDBMS, according to an embodiment of the present invention.

Figure 3A:
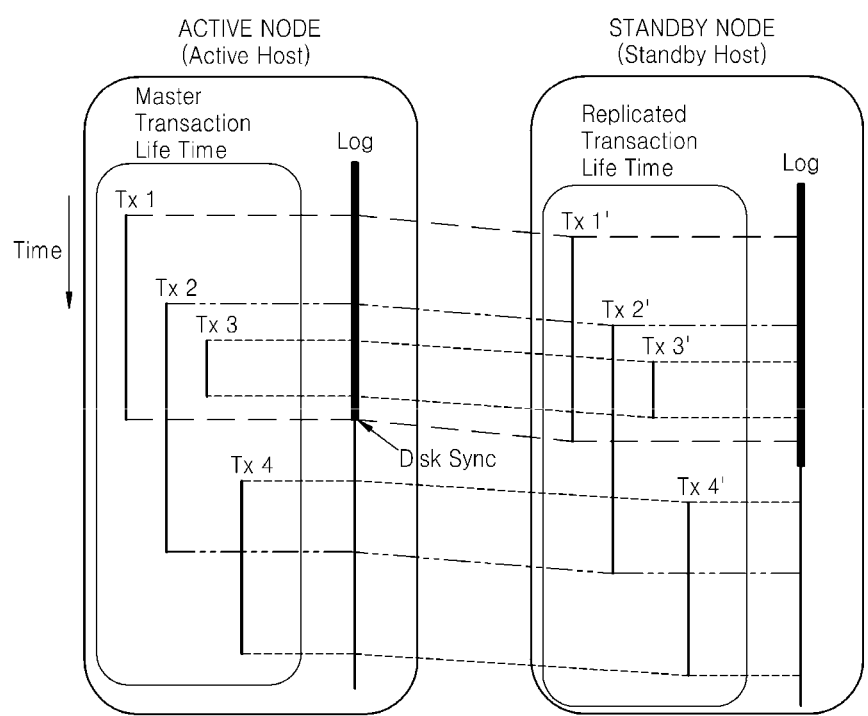
FIGS. 3A, 3B, 3C, and 3D are diagrams for explaining a process of removing data mismatch due to the loss of a transaction in an MMDBMS, according to an embodiment of the present invention.

FIG. 3A illustrates a case where no failure of four transactions Tx1, Tx2, Tx3, and Tx4 having different life cycles occurs.

In the active node, the transactions Tx1, Tx2, Tx3, and Tx4 are performed in the order listed, and committed in a local memory in an order of the transactions Tx3, Tx1, Tx2, and Tx4. Logs belonging to each of the transactions Tx1, Tx2, Tx3, and Tx4 are replicated to the standby node in an order in which the logs are recorded. Accordingly, transactions Tx1', Tx2', Tx3', and Tx4' of the standby node which respectively correspond to the transactions Tx1, Tx2, Tx3, and Tx4 of the active node are generated and committed in the same orders as those in which the transactions Tx1, Tx2, Tx3, and Tx4 of the active node are generated and committed.

All logs of the transactions Tx3 and Tx1 and some logs of the transaction Tx2 are flushed to a disk.

Figure 3B:
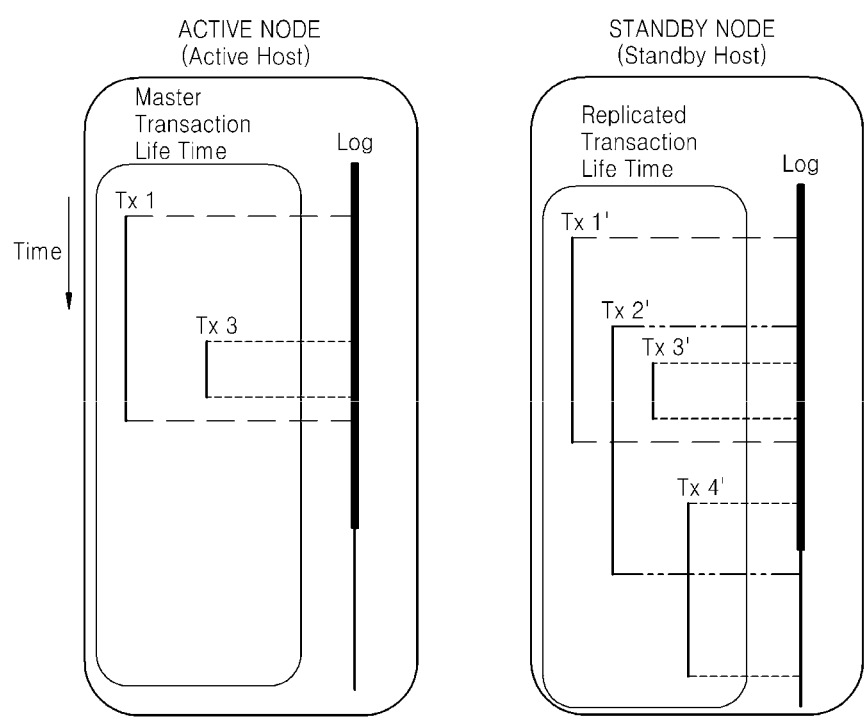

FIG. 3B illustrates a case where failure of the active node in FIG. 3A occurs.

Referring to FIG. 3B, since failure occurs before committed logs of the transactions Tx2 and Tx4 of the active node are flushed to the disk and thus logs recorded in a memory are lost, when the MMDBMS re-operates, the transaction Tx2 is rolled back and the transaction Tx4 is recognized as a non-existing transaction, thereby losing the transactions Tx2 and Tx4. As a result, data mismatch may occur between the active node and the standby node. This is because the MMDBMS supports the "commit" function that is performed in the local memory.

Figure 3C:
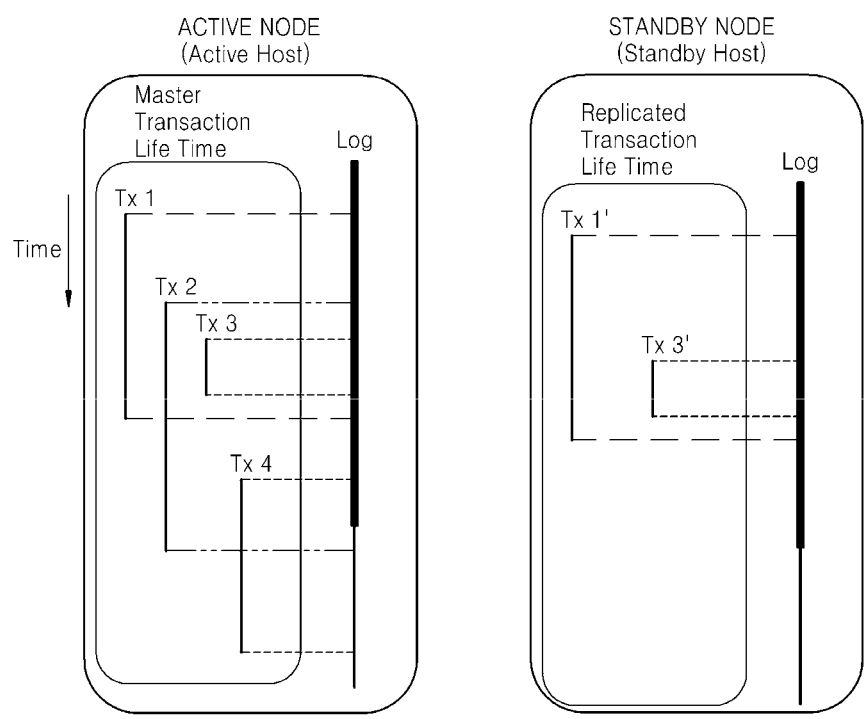

FIG. 3C illustrates a case where failure of the standby node in FIG. 3A occurs.

Referring to FIG. 3C, like in the case where failure of the active node occurs, when failure of the standby node occurs, since the failure occurs before committed logs of the transactions Tx2' and Tx4' of the standby node are flushed to a disk and thus logs recorded in a memory are lost, when the MMDBMS re-operates, the transaction Tx2' is undone and any of the transaction Tx4' is not recorded in a log buffer of the memory, thereby losing the transactions Tx2' and Tx4'.

Also, when the MMDBMS re-operates, a recovery process is performed, the active node tries to be connected to the standby node, and the active node is successfully connected to the standby node, the active node performs replication from a log after a previously replicated log. That is, since the active node already transmits all logs of the transactions Tx2 and Tx4 and recognizes that all logs are committed in the standby node, a time when the replication is performed may be set to a time after the transaction Tx4. Accordingly, the active node does not transmit again the logs of the transactions Tx2 and Tx4 which are already replicated, thereby causing data mismatch between the active node and the standby node. This is because the MMDBMS supports commitment in a memory. Accordingly, in the present embodiment, the standby node periodically reports SNs of logs that are flushed to a disk to the active node, and when the active node recognizes failure of the standby node, the active node performs replication again from a log after the reported logs.

Figure 3D:
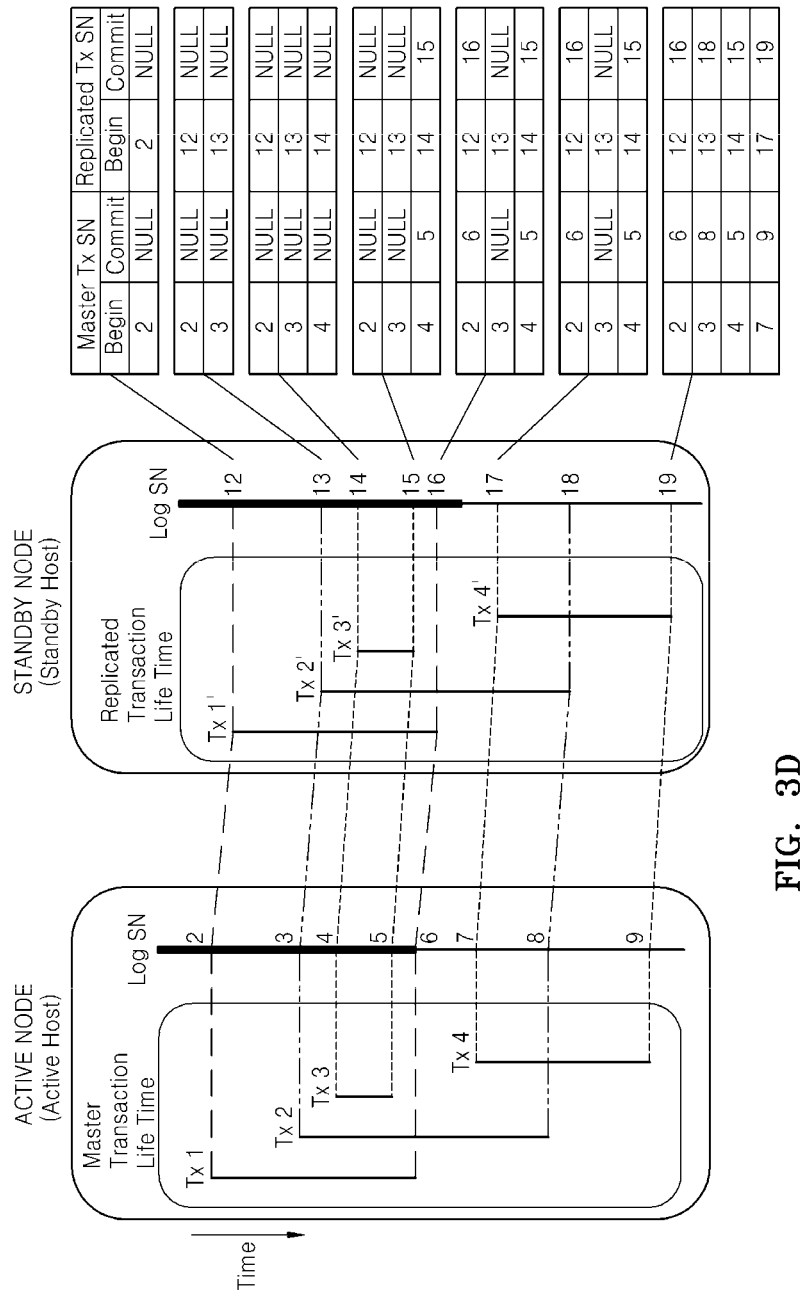

FIG. 3D illustrates a process of removing data mismatch by using a data management method in the state of FIG. 3B, according to an embodiment of the present invention.

Referring to FIG. 3D, the standby node maps an SN of a database log of the active node to an SN of each replication log of the standby node which is logged according to a transaction performed based on a log obtained by replicating the database log to obtain a result and generates a transaction table to store the result in units of transaction.

Although only SNs of a committed log and a beginning log of a transaction, instead of SNs of all logs, of a transaction are stored in the transaction table in FIG. 3D, the present embodiment is not limited thereto.

When the transactions Tx2 and Tx4 and logs recorded after a database log having an SN of 7 are lost due to failure of the active node, the active node transmits a message indicating that an SN of a last recovered log is 6 to the standby node, the standby node detects the transactions Tx2 and Tx4 to which database logs having SNs of 7, 8, and 9 that are database logs after the database log having the SN of 6 belong to and transmits replication logs of logs of the transactions Tx2 and Tx4 to the active node, and the active node recovers a database based on the replication logs, thereby removing data mismatch between the active node and the standby node.

As described above, when unexpected failure of any one of an active node and a standby node occurs, since data of the failed node is recovered by using information stored in the remaining node that is not failed, data mismatch due to the loss of a transaction may be prevented, data consistency may be maintained without a user's additional intervention, and durability of a transaction in an MMDBMS may be ensured.

The present invention may be embodied as computer-readable codes stored in a non-transitory computer-readable recording medium. The computer-readable codes are configured to cause a processor of a computer to perform the methods of the various embodiments described herein. The non-transitory computer-readable recording medium may be any recording apparatus capable of storing data that is read by a computer system. Examples of the non-transitory computer-readable recording medium include read-only memories (ROMs), random-access memories (RAMs), CD-ROMs, magnetic tapes, floppy disks, and optical data storage devices. The non-transitory computer readable medium may be distributed among computer systems that are interconnected through a network, and the present invention may be stored and implemented as computer readable codes in the distributed system. Functional programs, codes, and code segments for embodying the present invention may be easily derived by programmers in the technical field to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for managing a database of an active node of a main memory database management system (MMDBMS) that is replicated from the active node to a standby node, the apparatus comprising:
    a memory logging unit that records a database log to which a sequence number is sequentially allocated in a log buffer of a memory of the active node;
    a replicating unit that replicates the database log to the standby node, wherein the standby node maintains a mapping from sequence numbers of database logs received from the active node to sequence numbers of replication logs stored in the standby node, the replication logs corresponding to received database logs, the mapping further associating the sequence numbers of the database logs received to corresponding transactions;
    a disk flushing unit that periodically flushes the database log to a disk of the active node; and
    a recovering unit that, when failure of the active node occurs:
        identifies a database log that is stored in the disk as a last recovered log;
        transmits a sequence number of the last recovered log to the standby node,
        receives at least one replication log belonging to a transaction comprising a lost log recorded after the last recovered log from the standby node, wherein the standby node identifies the replication log and the transaction based on the mapping, and
        recovers the database of the active node based on the at least one replication log.

2. The apparatus of claim 1, wherein storing of the database log is performed independently from committing of a transaction comprising the database log and replicating of the database log.

3. The apparatus of claim 1, wherein sequence numbers of the database logs are allocated to sequentially increase, and the lost log is a database log having a sequence number greater than a sequence number of the last recovered log.

4. The apparatus of claim 1, further comprising a recovery information managing unit that allows a sequence number of a database log corresponding to the replication log flushed to the disk of the standby node to be periodically reported thereto from the standby node, and responsive to failure of the standby node, recovers a database of the standby node by replicating database logs recorded after a database log having a sequence number that is finally received to the standby node.

5. A computer-implemented method of managing a database of an active node of a main memory database management system (MMDBMS) that is replicated from the active node to a standby node, the method comprising:

recording a database log to which a sequence number is sequentially allocated in a log buffer of a memory of the active node;

replicating the database log to the standby node, wherein the standby node maintains a mapping from sequence numbers of database logs received from the active node to sequence numbers of replication logs stored in the standby node, the replication logs corresponding to received database logs, the mapping further associating the sequence numbers of the database logs received to corresponding transactions;

periodically storing the database log in a disk of the active node; and receiving, from the standby node, a sequence number of a database log corresponding to a replication log flushed to a disk of the standby node.

6. The method of claim 5, further comprising:

responsive to a failure of the active node, identifying a database log that is stored in the disk as a last recovered log and transmitting to the standby node, a sequence number of the last recovered log;

receiving, from the standby node, at least one replication log belonging to a transaction comprising a lost log recorded after the last recovered log; and recovering the database of the active node based on the at least one replication log.

7. The method of claim 6, wherein sequence numbers of database logs are allocated to sequentially increase, wherein the lost log is a database log having a sequence number greater than a sequence number of the last recovered log.

8. The method of claim 5, further comprising:

responsive to a failure of the standby node, replicating database logs recorded after a database log having a sequence number that is finally received to the standby node.

9. A non-transitory computer readable storage medium storing a computer program product including computer instructions configured to cause a processor of a computer to manage a database of an active node of a main memory database management system (MMDBMS) that is replicated from the active node to a standby node, the computer program product comprising:

a memory logging unit configured to record a database log to which a sequence number is sequentially allocated in a log buffer of a memory of the active node;

a replicating unit configured to replicate the database log to the standby node, wherein the standby node maintains a mapping from sequence numbers of database logs received from the active node to sequence numbers of replication logs stored in the standby node, the replication logs corresponding to received database logs, the mapping further associating the sequence numbers of the database logs received to corresponding transactions;

a disk flushing unit configured to periodically flush the database log to a disk of the active node; and a recovering unit configured to:

responsive to failure of the active node, identify a database log that is stored in the disk as a last recovered log and transmit a sequence number of the last recovered log to the standby node;

receive, from the standby node, at least one replication log belonging to a transaction comprising a lost log recorded after the last recovered log, wherein the standby node identifies the replication log and the transaction based on the mapping; and recover the database of the active node based on the at least one replication log.

10. The non-transitory computer readable storage medium of claim 9, wherein the sequence number of the database log is allocated to sequentially increase, and the lost log is a database log having a sequence number greater than a sequence number of the last recovered log.

11. The non-transitory computer readable storage medium of claim 9, wherein the computer program product further comprises:

a recovery information managing unit configured to:

receive periodically, from a standby node, a sequence number of a database log corresponding to the replication log flushed to the disk of the standby node, and responsive to failure of the standby node, recover a database of the standby node by replicating to the standby node, database logs recorded after a database log having a sequence number that is finally received.

12. An apparatus for managing a database of a standby node of a main memory database management system (MMDBMS) that is replicated from an active node to the standby node, the apparatus comprising:

a memory logging unit that allows a database log to which a sequence number is sequentially allocated to be replicated thereto from the active node, and records changes to the database which occur during a transaction performed based on the database log as a replication log to a log buffer of a memory of the standby node, and maintains a mapping from sequence numbers of database logs received from the active node to sequence numbers of replication logs stored in the standby node, the replication logs corresponding to received database logs, the mapping further associating the sequence numbers of the database logs received to corresponding transactions;

a disk flushing unit that periodically flushes the replication log to a disk of the standby node;

a log flush reporting unit that periodically reports a sequence number of a database log corresponding to the flushed replication log to the active node; and a recovering unit that, when failure of the standby node occurs:

receives a recovery-replication log obtained by replicating a database log after a database log having a sequence number that is finally reported from the active node, and recovers the database of the standby node based on the replication log for recovery.

13. The apparatus of claim 12, further comprising:

a log searching unit that, when failure of the active node occurs, receives a sequence number of a last recovered log that is finally recovered from the active node and searches for all replication logs belonging to a transaction comprising a lost log after the last recovered log; and a replication log transmitting unit that transmits the searched replication logs to the active node.

14. A computer-implemented method of managing a database of a standby node of a main memory database management system (MMDBMS) that is replicated from an active node to the standby node, the method comprising:

allowing a database log to which a sequence number is sequentially allocated to be replicated from the active node;

recording changes to the database which occur during a transaction performed based on the database log as a replication log to a log buffer of a memory of the standby node;

storing the replication log and a sequence number of a database log corresponding to the replication log comprising a mapping from sequence numbers of database logs received from the active node to sequence numbers of replication logs stored, the replication logs corresponding to received database logs, the mapping further associating the sequence numbers of the database logs received to corresponding transactions;

periodically flushing the replication log to a disk of the standby node; and periodically reporting a sequence number of a database log corresponding to the replication log flushed to the disk to the active node.

15. The method of claim 14, further comprising:

when failure of the active node occurs, receiving a sequence number of a last recovered log that is finally recovered from the active node;

searching for all replication logs belonging to a transaction comprising a lost log after the last recovered log based on the mapping from sequence numbers of database logs received to sequence numbers of replication logs; and transmitting the searched replication logs to the active node.

16. The method of claim 14, further comprising:

when failure of the standby node occurs, receiving a recovery-replication log obtained by replicating a database log after a database log having a sequence number that is finally reported from the active node; and recovering the database of the standby node based on the replication log for recovery.

17. A non-transitory computer readable storage medium storing a computer program product including computer instructions configured to cause a processor of a computer to manage a database of a standby node of a main memory database management system (MMDBMS) that is replicated from an active node to the standby node, the computer program product comprising:

a memory logging unit configured to allow a database log to which a sequence number is sequentially allocated to be replicated thereto from the active node, and record changes to the database which occur during a transaction performed based on the database log as a replication log to a log buffer of a memory of the standby node, the memory logging unit further configured to maintain a mapping from sequence numbers of database logs received from the active node to sequence numbers of replication logs stored in the standby node, the replication logs corresponding to received database logs, the mapping further associating the sequence numbers of the database logs received to corresponding transactions;

a disk flushing unit configured to periodically flush the replication log to a disk of the standby node;

a log flush reporting unit configured to periodically report a sequence number of a database log corresponding to the flushed replication log to the active node; and a recovering unit that is configured to:

responsive to a failure of the standby node, receive a recovery-replication log obtained by replicating a database log after a database log having a sequence number that is finally reported from the active node, and recover the database of the standby node based on the replication log for recovery.

18. The non-transitory computer readable storage medium of claim 17, wherein the computer program product further comprises:

a log searching unit configured to:

responsive to a failure of the active node, receive a sequence number of a last recovered log that is finally recovered from the active node and search for all replication logs belonging to a transaction comprising a lost log after the last recovered log; and a replication log transmitting unit configured to transmit the searched replication logs to the active node.

* * * * *